No. 780,677. PATENTED JAN. 24, 1905.
S. A. MASSEY.
THREE HORSE EVENER.
APPLICATION FILED MAY 21, 1904.
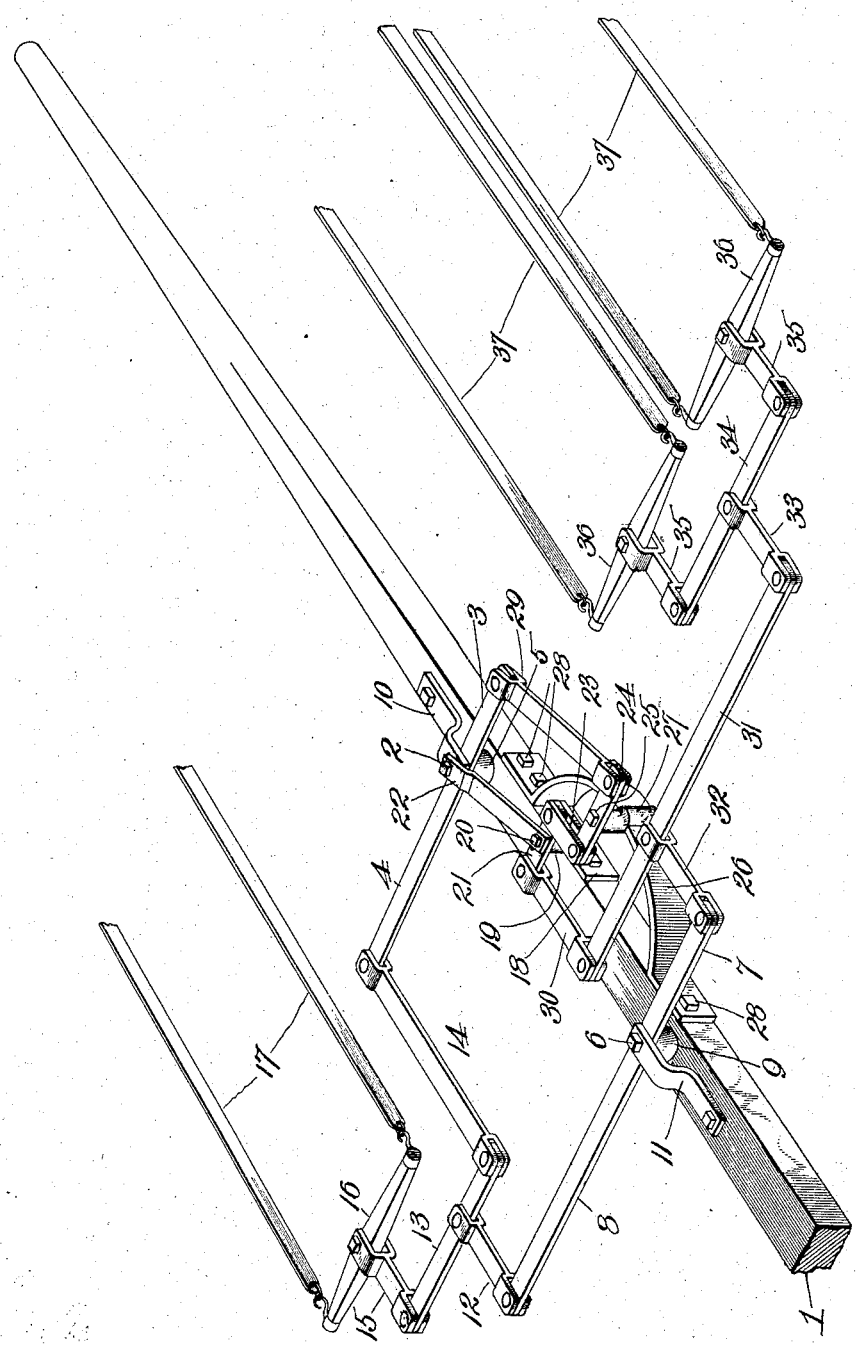
Witnesses
F. R. Glow.
H. C. Rodgers.
Inventor
S. A. Massey
By George J. Thorpe
Atty.

No. 780,677.

Patented January 24, 1905.

UNITED STATES PATENT OFFICE.

SAMUEL A. MASSEY, OF FRANKFORT, KANSAS.

THREE-HORSE EVENER.

SPECIFICATION forming part of Letters Patent No. 780,677, dated January 24, 1905.

Application filed May 21, 1904. Serial No. 209,019.

*To all whom it may concern:*

Be it known that I, SAMUEL A. MASSEY, a citizen of the United States, residing at Frankfort, in the county of Marshall and State of Kansas, have invented certain new and useful Improvements in Three-Horse Eveners, of which the following is a specification.

My invention relates to three-horse eveners of that type peculiarly adapted for use on cultivators and wagons, and is designed more especially as an improvement over the three-horse evener on which I secured Patent No. 752,087, February 16, 1904, my special object in this connection being to produce an evener which relieves the tongue of side pressure, and therefore more equally distributes the pulling strain on the draft-animals.

With this general object in view the invention consists in certain novel and peculiar features of construction and organization, as hereinafter described and claimed, and in order that it may be fully understood reference is to be had to the accompanying drawing, which represents a perspective view of a three-horse evener embodying my invention.

In said drawing, 1 designates the tongue of a cultivator, wagon, or other vehicle.

2 is a bolt extending vertically through the tongue and uniting pivotally to the same, the front evener bar or lever, the latter being so pivoted that its arm 3, projecting to the right, is about one-half the length of arm 4, which projects to the left, a washer 5 being interposed between the tongue and lever, upon the bolt, to prevent frictional engagement between the evener and the tongue when the former moves. 6 designates a second bolt extending vertically through the tongue at a suitable distance rearward of bolt 2, and mounted pivotally upon the bolt 6 is the rear evener bar or lever, the same being preferably of greater length than the front one and also pivoted to produce the right and left hand arms 7 and 8, respectively, the former being preferably of about one-half the length of the latter. Said rear evener bar or lever is preferably supported in the same horizontal plane as the front one, a washer 9 upon bolt 6 being interposed between said bar or lever and the tongue, and to brace said bolts 2 and 6 I employ the longitudinally-extending straps 10 and 11, respectively, said straps being bolted to the tongue and of angular formation, so as to engage the bolts above the evener bars or levers and at the same time leave said bars or levers free for pivotal operation.

Pivoted at its rear end to the outer end of arm 8 and projecting forwardly therefrom is a link 12, the front end of said link being pivotally connected to the short transverse lever 13 at a distance from its right-hand end equal to about one-third of its length, said right-hand end of lever 13 being pivotally connected by link 14 to the left-hand end of the front evener bar or lever. Pivoted to the opposite end of lever 13 is a link 15, carrying pivotally a swingletree 16, to which the traces 17 are attached in the usual or any preferred manner.

18 designates a plate secured, by preference, to the right-hand side of the tongue and provided with a boss 19, which projects upwardly to about the plane of the top of the washers 5 and 9, and pivotally mounted at its center on bolt 20, carried by the boss of said plate, is a short transverse lever 21, the pivot-bolt being braced by the bar 22, which bar is secured at its front end on bolt 2, so as to brace the same also.

The right-hand end of lever 21 is pivotally connected by the longitudinally-extending link or links 23 to the left-hand end of a transversely-extending lever 24, pivotally mounted at its center upon bolt 25, engaging the boss or enlargement 27 of a segmental bracket 26, said bracket being bolted, as at 28, to the tongue and projecting from the right-hand side of the same. The right-hand end of lever 24 is pivotally connected by a link 29 to the right-hand end or arm 3 of the front evener bar or lever, said link converging forwardly with respect to the tongue. The left-hand end of lever 21 is pivotally connected by the longitudinally-extending link 30 to the corresponding end of a transversely-extending lever 31, said lever being fulcrumed at a distance from its left-hand end equal to about one-third of its length on the front end of a link 32, pivotally connected at its rear end to the right-hand end or arm of the rear evener bar or lever.

33 is a link pivotally connecting the outer end of lever 31 with the doubletree 34 at its center, said doubletree having its ends pivotally connected by links 35 to the swingletrees 36, equipped with traces 37 of the type shown or of any other suitable or preferred type.

In practice all of the longitudinally-extending links except link 29 maintain a position substantially parallel with the tongue at all times, though of course they are in constant vibratory movement to a limited extent, the length of these vibrations being more or less, accordingly as the draft-animals at one side vary their position with relation to the draft-animal at the opposite side of the tongue. As a consequence of this substantial parallelism of said links with the tongue the draft is in the same direction and equally distributed, whereas with all other three-horse eveners with which I am familiar wherein the links between the evener-bars extend at an angle to the tongue the latter is crowded more or less first to one side and then the other, which obviously results in an imperfect distribution of draft. With the levers and links arranged as shown the pulling strain is distributed about equally between the horses, as the single horse is given twice as much leverage as the team.

From the above description and drawing it will be apparent that I have produced a three-horse evener possessing the features of advantage enumerated as desirable and which, while embodying the preferred construction of the same, is obviously susceptible of modification in minor particulars without departing from the essential spirit and scope or sacrificing any of the advantages of the invention.

Having thus described the invention, what I claim as new, and desire to secure by Letters Patent, is—

1. A three-horse evener, comprising a tongue; a front and a rear transverse lever pivoted thereon; a third lever, linked at its inner end to one of said transverse levers, and between its ends linked to the proximate end of the other transverse lever; a swingletree supported from the outer end of said third lever; a fourth lever; a doubletree carried by said fourth lever at the opposite side of the tongue from the swingletree; a fifth lever, mounted on the tongue; pivotal connections between the opposite ends of said lever and the proximate ends of the front transverse lever and the said fourth lever; and a link pivotally connecting said fourth lever to the proximate end of the rear transverse lever.

2. A three-horse evener, comprising a tongue; a front and a rear transverse lever pivoted thereon; a third lever, linked at its inner end to one of said transverse levers, and between its ends linked to the proximate end of the other transverse lever; a swingletree supported from the outer end of said third lever; a fourth lever; a doubletree carried by said fourth lever at the opposite side of the tongue from the swingletree; a fifth lever, mounted on the tongue; a sixth lever, supported from the tongue at the right-hand side and rearward of the fifth lever, a link connecting the contiguous ends of said levers; a link connecting the right-hand end of the front lever and the sixth lever; a link connecting the left-hand end of the fourth and fifth levers; and a link connecting the right-hand end of the rear lever with the fourth lever at a point to the left of the center of said lever.

3. A three-horse evener, comprising a tongue, a front and a rear transverse lever pivoted thereon, a third lever, linked at its inner end to one of said transverse levers, and between its ends linked to the proximate end of the other transverse lever; a swingletree supported from the outer end of said third lever; a fourth lever; a doubletree carried by said fourth lever at the opposite side of the tongue from the swingletree; a fifth lever, mounted on the tongue, a bracket secured to and projecting from the right-hand side of the tongue; a sixth lever, mounted thereon rearward of the fifth lever; a link connecting the contiguous ends of said levers; a link connecting the right-hand end of the front lever and the sixth lever; a link connecting the left-hand end of the fourth and fifth levers; and a link connecting the right-hand end of the rear lever with the fourth lever at a point to the left of the center of said lever.

4. A three-horse evener comprising a tongue; a front and a rear transverse lever pivoted thereon; a third lever, linked at its inner end to one of said transverse levers, and between its ends linked to the proximate end of the other transverse lever; a swingletree supported from the outer end of said third lever; a fourth lever; a doubletree carried by said fourth lever at the opposite side of the tongue from the swingletree; a fifth lever, mounted on the tongue, a bracket secured to and projecting from the right-hand side of the tongue, a sixth lever, mounted thereon rearward of the fifth lever; a link connecting the contiguous ends of said levers; a link connecting the right-hand end of the front lever and the sixth lever; a link connecting the left-hand end of the fourth and fifth levers; a link connecting the right-hand end of the rear lever with the fourth lever at a point to the left of the center of said lever, strap-braces secured to the tongue and to the pivots of the front and rear levers; and a brace connecting the pivots of the front lever and the fifth lever.

In testimony whereof I affix my signature in the presence of two witnesses.

SAMUEL A. MASSEY.

Witnesses:
G. D. CURRY,
W. H. CEASER.